(12) United States Patent
Jeon

(10) Patent No.: US 7,081,015 B2
(45) Date of Patent: Jul. 25, 2006

(54) RECHARGEABLE BATTERY WITH INTEGRATED PROTECTION CIRCUIT

(75) Inventor: Hyung-Woo Jeon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/066,662

(22) Filed: Feb. 24, 2005

(65) Prior Publication Data
US 2005/0189912 A1 Sep. 1, 2005

(30) Foreign Application Priority Data
Feb. 28, 2004 (KR) .................. 10-2004-0013808

(51) Int. Cl.
*H01R 13/60* (2006.01)

(52) U.S. Cl. .......................... 439/569; 429/7

(58) Field of Classification Search ............... 439/569, 439/500, 573; 429/7, 61, 96, 100
See application file for complete search history.

(56) References Cited

U.S. PATENT DOCUMENTS

| | | | | |
|---|---|---|---|---|
| 4,455,357 A | * | 6/1984 | Rorer et al. | 429/179 |
| 4,719,159 A | * | 1/1988 | Clark et al. | 429/159 |
| 4,977,043 A | * | 12/1990 | Kadouchi et al. | 429/54 |
| 6,241,556 B1 | * | 6/2001 | Chih | 439/607 |
| 6,379,186 B1 | * | 4/2002 | Shi et al. | 439/607 |
| 6,432,575 B1 | * | 8/2002 | Yamagami | 429/100 |
| 6,492,058 B1 | * | 12/2002 | Watanabe et al. | 429/121 |
| 6,641,949 B1 | * | 11/2003 | Cheiky et al. | 429/53 |
| 6,803,144 B1 | * | 10/2004 | Hovi et al. | 429/123 |
| 6,824,917 B1 | * | 11/2004 | Aaltonen et al. | 429/97 |
| 2005/0122667 A1 | * | 6/2005 | Moon | 361/600 |
| 2005/0153172 A1 | * | 7/2005 | Han | 429/7 |

FOREIGN PATENT DOCUMENTS

WO  WO 03069698  8/2003

* cited by examiner

*Primary Examiner*—Tulsidas C. Patel
*Assistant Examiner*—Phuongchi Nguyen
(74) *Attorney, Agent, or Firm*—Lee, Hong, Degerman, Kang & Schmadeka

(57) ABSTRACT

A rechargeable battery with an integrated protection circuit is made to have a high rigidity to withstand an external impact. The rechargeable battery comprises a case having an enclosed internal space for housing a battery cell, a circuit board having the protection circuit, the circuit board electrically connected to the case at a first end, a reinforcing member formed at the first end where the circuit board is connected, and a molding member formed at the first end of the case for encapsulating the circuit board and the reinforcing member.

23 Claims, 5 Drawing Sheets

RECHARGEABLE BATTERY WITH INTEGRATED PROTECTION CIRCUIT

CROSS-REFERENCE TO RELATED APPLICATIONS

Pursuant to 35 U.S.C. § 119(a), this application claims the benefit of earlier filing date and right of priority to Korean Application No. 10-2004-13808, filed on Feb. 28, 2004, the contents of which is hereby incorporated by reference herein in its entirety.

BACKGROUND OF THE INVENTION

1. Field of the Invention

The present invention relates to a rechargeable battery, and more particularly, to a rechargeable battery with an integrated protection circuit having high rigidity to withstand an external impact.

2. Description of the Related Art

Generally, batteries are divided into two groups: general batteries, which are non-recoverable once used and rechargeable batteries, which are recoverable. Rechargeable batteries are chemical cells capable of charging and discharging and are widely used as small-scale batteries for small-scale devices such as portable phones and notebook computers as well as large-scale batteries such as industrial power storage batteries and batteries for use in electric motor cars.

Currently used batteries such as lead batteries, nickel-cadmium batteries, nickel-hydrogen batteries, and lithium-ion batteries have recently garnered attention due to a sharp increase in demand for portable electronic devices. Particularly, lithium ion batteries have become popular because they have a high energy density and high operating voltage, excellent conservation and life properties and are environmentally friendly.

In order to protect rechargeable batteries, a protection circuit is necessary. For example, if a voltage of the battery exceeds a specific value, the protection circuit stops the charging of the battery to prevent overheating or explosion due to overcharging. Furthermore, if a voltage of the battery is less than a specific value, the protection circuit can stop the discharging of the battery to prevent battery damage due to over-discharging. The protection circuit can also stop the discharging of the battery if an abnormal current flow exists in the battery due to an instrumental error. The protection circuit may also instantaneously stop the charging of the battery if a dangerously large amount of current flows in the battery due to an external short-circuiting of a battery pack. Thus, rechargeable batteries integrated with such a protection circuit are currently being used.

FIG. 1 is a perspective view of a related art rechargeable battery with an integrated protection circuit. FIG. 2 is a perspective view of a related art rechargeable battery with an integrated protection circuit in which a molding member has been removed. FIG. 3 is a vertical sectional view of a related art rechargeable battery with an integrated protection circuit as shown in FIG. 1.

Referring to FIGS. 1 and 3, the related art rechargeable battery with an integrated protection circuit comprises a case 10 having an enclosed internal space for housing a battery cell 12, a circuit board 30 having a protection circuit electrically connected to a plane of the case 10, and a molding member 32 injection molded on a plane of the case 10 for covering the circuit board 30.

The case 10 comprises a receptacle member 9 having an opening, a battery cell 12 installed in the receptacle member 9, and a cover member 16 enclosing the opening of the receptacle member 9 to prevent the flow of electrolyte out of the receptacle member 9. Preferably, the cover member 16 is joined to the receptacle member 9 by laser welding to enclose the opening of the receptacle member 9. The receptacle member 9 and the cover member 16 may be made of aluminum or stainless steel.

The circuit board 30 having the protection circuit is electrically connected to the cover member 16 of the case 10 through a connecting member 25. Furthermore, as shown in FIG. 3, the molding member 32 is injection molded to the cover member 16 of the case 10 so that a terminal 31 of the circuit board 30 is exposed to the outside. The molding member 32 is made of a nylon-type resin and injection molded under a low temperature and low pressure to protect the circuit board 30 having the protection circuit.

The connecting member 25 is made of nickel having good conductivity and is formed as a plate having a thickness of 0.2 mm. Using spot welding, an end of the connecting member 25 is connected to the circuit board 30 while another end thereof is connected to the cover member 16 of the case 10. Referring to FIG. 4, in an attempt to more firmly bond and couple the molding member 32 to the case 10, the molding member 32 is injection molded to cover a predetermined portion of the outer periphery of the cover member 16.

However, when the molding member is injection molded to the cover member of the battery body, the battery body and the molding member are not firmly bonded to each other. Therefore, the related art rechargeable battery with integrated protection circuit is problematic because the spot welding portion of the connecting member may sever if the battery is dropped, receives an external impact, or cracks, thus degrading the power source.

Additionally, when the molding member is injection molded to cover the outer periphery of the cover member of the battery body, because the thickness of the molding member bonding to the outer periphery is no more than 0.2 mm, the molding member lacks the strength to uphold the bond. Over time, a gap is generated between the battery body and the molding member. Accordingly, the battery may produce air bubbles. This is a problem when labeling the surface of the battery, as the air bubbles increase the overall thickness of the labeled battery.

SUMMARY OF THE INVENTION

The present invention is directed to a rechargeable battery with an integrated protection circuit having high rigidity to withstand an external impact.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a rechargeable battery with an integrated protection circuit, comprising a case having an enclosed internal space for housing a battery cell, a circuit board having a protection circuit, the circuit board electrically connected to the case at a first end, a reinforcing member formed at the first end where the circuit board is connected, and a molding member formed at the first end for encapsulating the circuit board and the reinforcing member. The circuit board is electrically connected to a terminal end of the case. The reinforcing member is formed at a terminal end of the case. The molding member is formed at a terminal end of the case.

The case may be made of a lightweight and rigid material such as aluminum or stainless steel and comprises a receptacle member having an opening, the battery cell being housed in the receptacle member and a cover member for closing the opening of the receptacle member. Preferably, the cover member prevents flow of electrolyte out of the receptacle member and provides a conductive interface to the battery cell, wherein the cover member is coupled to the receptacle member by a welding process. The circuit board is electrically connected to the cover member through a connecting member.

In a detailed aspect, the reinforcing member comprises an elongated plate forming an edge along the periphery of the first end of the case, wherein the reinforcing member is projected a predetermined distance away from the first end of the case. Further, the reinforcing member is formed such that an outer perimeter of the reinforcing member is within a perimeter of an opening of the case by a predetermined distance. The reinforcing member may also comprise a plurality of holes.

In another aspect, the molding member is injection molded to the cover member such that an external terminal of the circuit board is externally exposed. Also, the molding member may be injection molded to the cover member through a plurality of holes formed in the reinforcing member.

In one embodiment, the reinforcing member is discontinuously formed along the periphery of the first end of the case, wherein the reinforcing member comprises a first reinforcing part formed at a first edge of the first end and extending to lateral edges thereof and a second reinforcing part formed at a second edge of the first end of the case. Preferably, the first and second reinforcing parts are formed at a predetermined inward distance from the outer circumference of the first end, wherein the first and second reinforcing parts comprise a plurality of holes.

In one aspect, the cover member has a rough surface, wherein the surface of the cover member may be made rough by etching the surface with acid. Further, the surface of the cover member may be made rough by scratching the surface.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
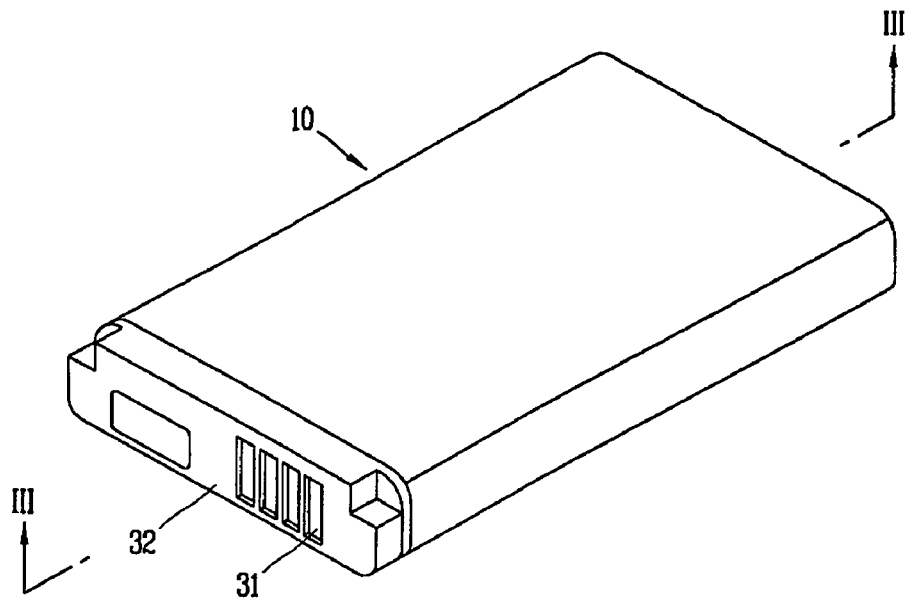
FIG. 1 is a perspective view of a related art rechargeable battery with an integrated protection circuit.
Figure 2:
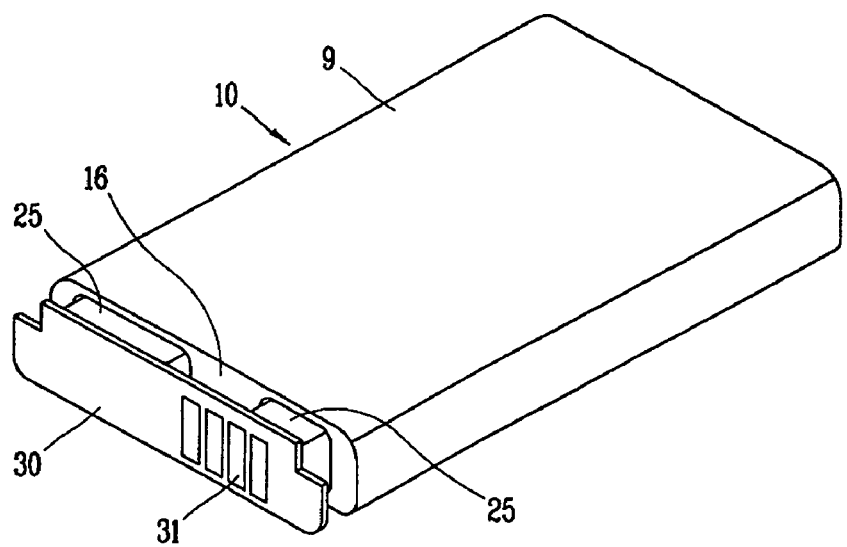
FIG. 2 is a perspective view of a related art rechargeable battery with an integrated protection circuit from which a molding member is removed.
Figure 3:
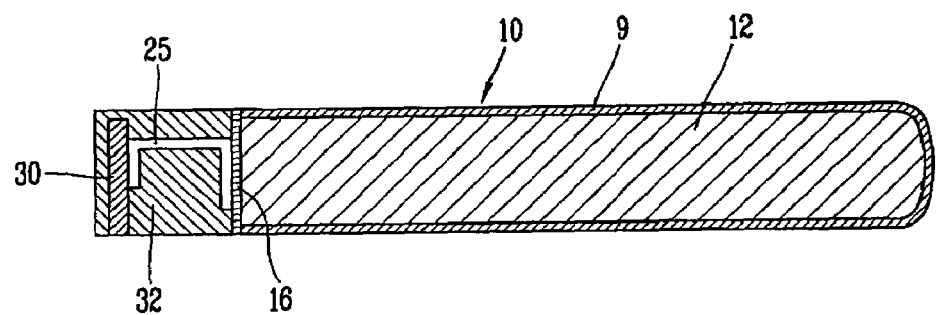
FIG. 3 is a vertical sectional view along the line III—III of FIG. 1.
Figure 4:
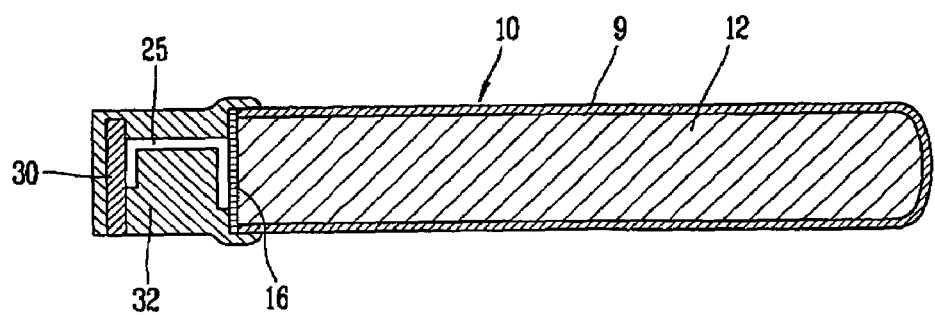
FIG. 4 is a vertical sectional view of a related art rechargeable battery with an integrated protection circuit.
Figure 5:
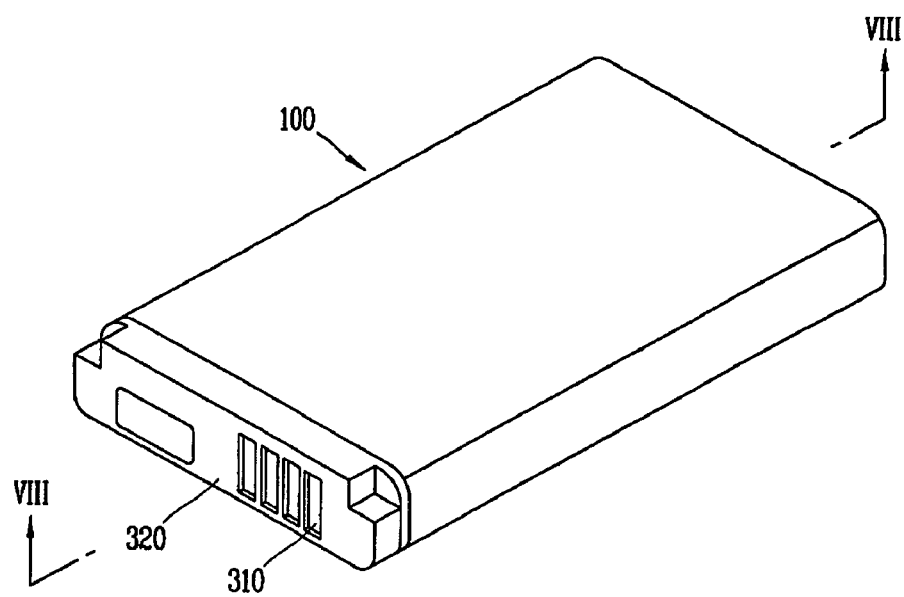
FIG. 5 is a perspective view of a rechargeable battery with an integrated protection circuit in accordance with one embodiment of the invention.
Figure 6:
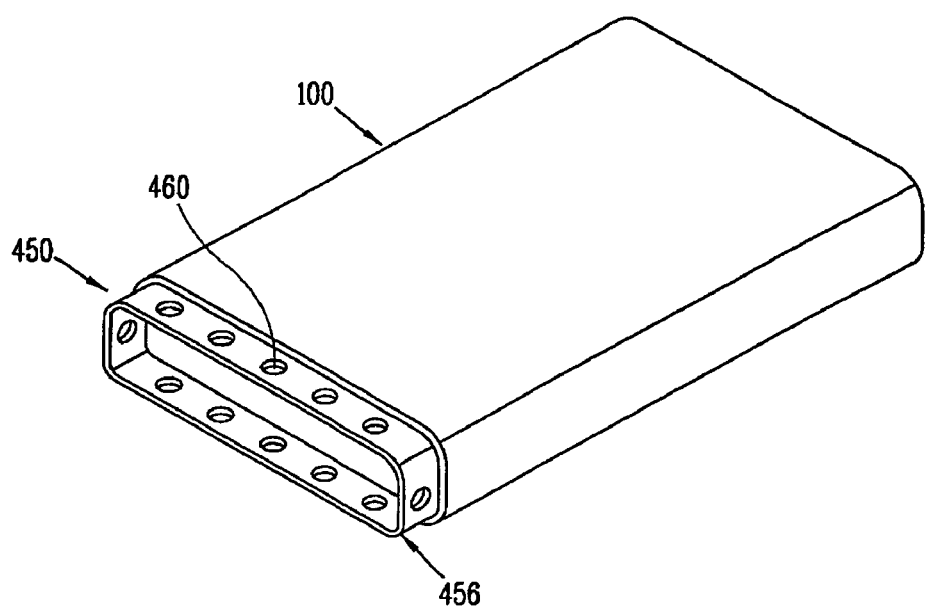
FIG. 6 is a perspective view of a rechargeable battery with an integrated protection circuit having a reinforcing member in accordance with one embodiment of the invention.
Figure 9:
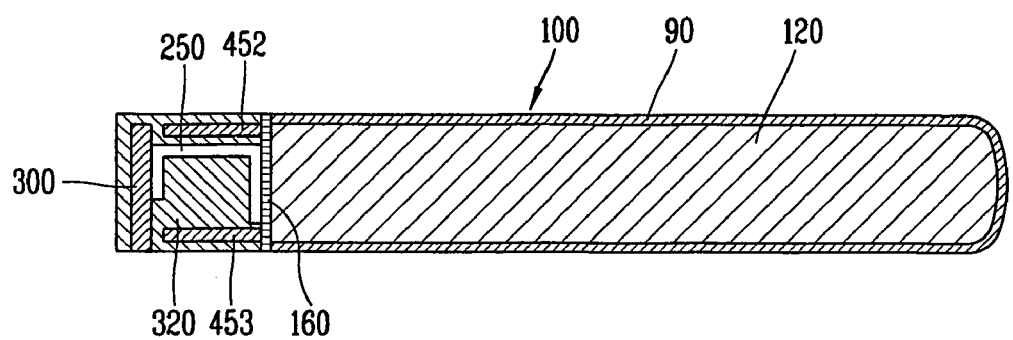
FIG. 9 is a vertical sectional view along the line VIII-VIII of FIG. 5.

The present invention relates to a rechargeable battery with an integrated protection circuit having high rigidity to withstand an external impact. Referring to FIGS. 5, 6 and 9, the rechargeable battery with the integrated protection circuit comprises a case 100 having an enclosed internal space for housing a battery cell 120, a circuit board 300 having a protection circuit electrically connected to a plane of the case 100, a reinforcing member 450 formed about a first end of the case 100 to which the circuit board 300 is connected, and a molding member 320 injection molded to house the first end of the case 100 such that the circuit board 300 and the reinforcing member 450 are encapsulated therein.

Referring to FIG. 9, the case 100 comprises a receptacle member 90 having an opening, a battery cell 120 installed in the receptacle member 90, and a cover member 160 for enclosing the receptacle member 90 opening to prevent the flow of electrolyte out of the receptacle member 90. The cover member 160 also provides a conductive interface to the battery cell 120, in accordance with one embodiment.

The present invention relates to a rechargeable battery with an integrated protection circuit having high rigidity to withstand an external impact. Referring to FIGS. 5, 6 and 9, the rechargeable battery with the integrated protection circuit comprises a case 100 having an enclosed internal space for housing a battery cell 120, a circuit board 300 having a protection circuit electrically connected to a plane of the case 100, a reinforcing member 450 formed about a first end of the case 100 to which the circuit board 300 is connected, and a molding member 320 injection molded to house the first end of the case 100 such that the circuit board 300 and the reinforcing member 450 are encapsulated therein. The circuit board 300 may be electrically connected a terminal end of the case, such as a terminal end 456. Furthermore, the reinforcing member 450 may be formed at a terminal end of the case, such as the terminal end 456. Additionally, the molding member 320 may be formed at a terminal end of the case, such as the terminal end 456.

The circuit board 300 including the protection circuit is electrically connected to the cover member 160 through a connecting member 250. Preferably, the connecting member 250 is made of a conductive material such as nickel and is formed as a plate having a thickness of 0.2 mm. Using a bonding method such as spot welding, an end of the connecting member 250 is connected to the circuit board 300 while the other end is connected to the cover member 160.

The molding member 320 is injection molded to the cover member 160 of the case 100 so that an external terminal 310 of the circuit board 300 is exposed to the outside. The molding member 320 is made of a nylon-type resin, for example, and injection molded under a low temperature pressure to protect the circuit board 300 having the protection circuit.

The reinforcing member 450 has a plate-like form and is formed along the periphery of the first end of the case 100, wherein the reinforcing member 450 projects away from the periphery of the first end to form a railing there about. Preferably, the reinforcing member 450 is formed such that the outer perimeter of the reinforcing member 450 is within the perimeter of the opening of the case 100 by a predetermined distance. The reinforcing member 450 may be formed with a plurality of holes 460.

Preferably, the molding member 320 is injection molded through the plurality of holes 460. Thus, the case 100 and the molding member 320 are coupled tightly. Because of this, even if a strong external impact is applied to the battery, the connection between the circuit board 300 and the cover member 160 by the connecting member 250 remains stable.

Figure 7:
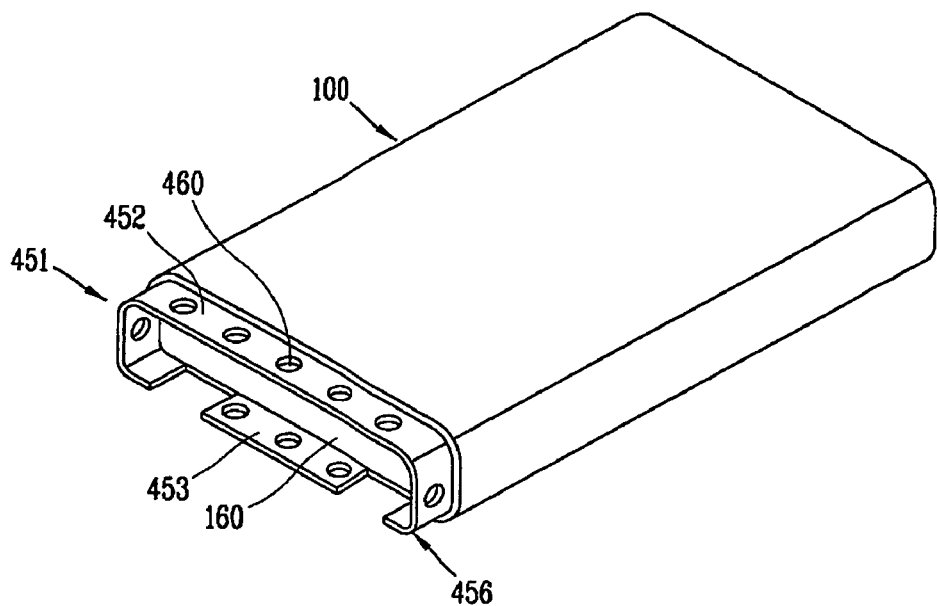
FIG. 7 is a perspective view of a rechargeable battery with an integrated protection circuit having a reinforcing member in accordance with another embodiment of the invention.
Figure 8:
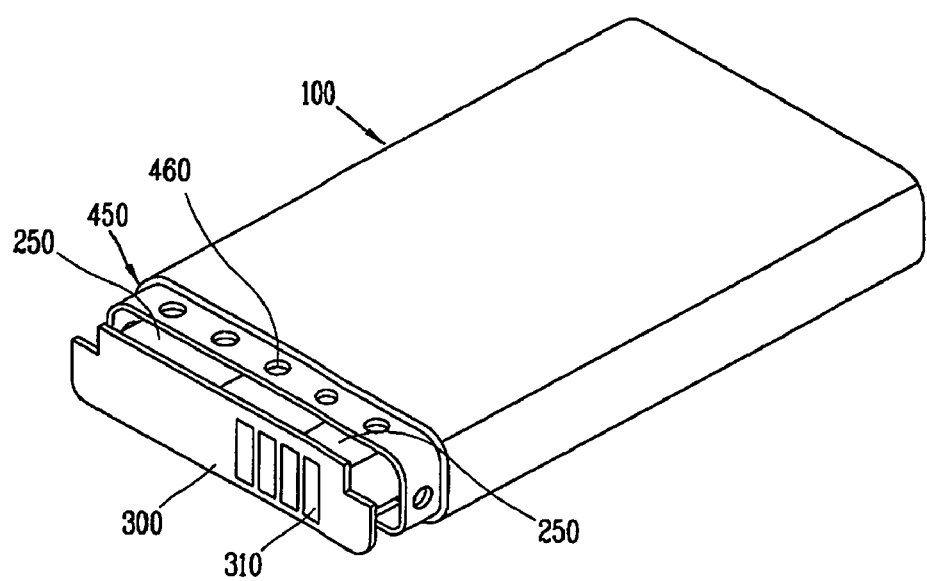
FIG. 8 is a perspective view of a rechargeable battery with an integrated protection circuit with a molding member removed in accordance with one embodiment of the invention.

Referring to FIG. 7, in an exemplary embodiment, a reinforcing member 451, is discontinuously formed along the periphery of the first end of the case 100. Such a structure allows the reinforcing member 451 to couple to the molding member 320 more tightly. The reinforcing member 451 comprises an upper reinforcing part 452 formed at an upper edge of the first end and extending to lateral edges thereof. The reinforcing member 451 further comprises a lower reinforcing part 453 formed at a lower edge of the first end of the case 100 at a predetermined distance from the opposite ends of the upper reinforcing part 452.

Preferably, the upper and lower reinforcing parts 452 and 453 are formed at a predetermined inward distance from the outer circumference of the opening of the case 100. The upper and lower reinforcing parts 452 and 453 may also have a plurality of holes 460.

In one embodiment, the cover member 160, to which the molding member 320 bonds is ruggedly surfaced. By surface treating the cover member 160 to have a rugged texture, the bonding area of the molding member 320 is increased. Thereby, frictional force is also increased. Accordingly, the molding member 320 is coupled to the case 100 more firmly. Surface treatment is enabled by etching the surface of the cover member 160 with a strong acid such as hydrochloric acid or by physically forming a large number of scratches on the surface with fine sand, for example.

In the rechargeable battery with an integrated protection circuit as described above, when the molding member is injection molded on a cover member of the case with the battery cell installed therein, the reinforcing member as well as the circuit board is embedded into the molding member, thereby coupling the molding member to the case more tightly.

Furthermore, a cover member of the battery body contacting the molding member is made rough by surface treatment to thereby make the bonding force between the molding member and the cover member of the battery body stronger.

Accordingly, when an external impact caused by dropping the rechargeable battery, for example, is applied, durability of the battery is superior to a related art rechargeable battery integrated with a protection circuit. Also, the connection between circuit board and the cover member via the connecting member remains stable.

Furthermore, unlike the related art, because there is no need to extend the molding member to the outer periphery of the cover member, gaps between the battery body and the molding member do not exist. Therefore, the problem of air bubbles increasing the overall thickness of a labeled battery is overcome.

The foregoing embodiments and advantages are merely exemplary and are not to be construed as limiting the present invention. The present teaching can be readily applied to other types of apparatuses. The description of the present invention is intended to be illustrative, and not to limit the scope of the claims, Many alternatives, modifications, and variations will be apparent to those skilled in the art. In the claims, means-plus-function clauses are intended to cover the structure described herein as performing the recited function and not only structural equivalents but also equivalent sutures.

What is claimed is:

1. A rechargeable battery with an integrated protection circuit, comprising:
   a case having an enclosed internal space for housing a battery cell;
   a circuit board having a protection circuit, the circuit board electrically connected to the case at a first end;
   a reinforcing member formed at the first end where the circuit board is connected; and
   a molding member formed at the first end for encapsulating the circuit board and the reinforcing member,
   wherein the reinforcing member comprises an elongated plate forming an edge along at least part of the periphery of the first end of the case.

2. The rechargeable battery of claim 1, wherein the circuit board is electrically connected a terminal end of the case.

3. The rechargeable battery of claim 1, wherein the reinforcing member is formed at a terminal end of the case.

4. The rechargeable battery of claim 1, wherein the molding member is formed at a terminal end of the case.

5. The rechargeable battery of claim 1, wherein the reinforcing member comprises a plurality of holes.

6. The rechargeable battery of claim 1, wherein the case comprises a lightweight and rigid material.

7. The rechargeable battery of claim 1, wherein the case comprises at least one of aluminum and stainless steal.

8. The rechargeable battery of claim 1, wherein the case comprises:
   a receptacle member having an opening, the battery cell being housed in the receptacle member; and
   a cover member for closing the opening of the receptacle member.

9. The rechargeable battery of claim 8, wherein the cover member prevents flow of electrolyte out of the receptacle member and provides a conductive interface to the battery cell.

10. The rechargeable battery of claim 8, wherein the cover member is coupled to the receptacle member by a welding process.

11. The rechargeable battery of claim 8, wherein the circuit board is electrically connected to the cover member through a connecting member.

12. The rechargeable battery of claim 8, wherein the molding member is injection molded to the cover member such that an external terminal of the circuit board is externally exposed.

13. The rechargeable battery of claim 8, wherein the molding member is injection molded to the cover member through a plurality of holes formed in the reinforcing member.

14. The rechargeable battery of claim 8, wherein the cover member has a rough surface.

15. The rechargeable battery of claim 14, wherein the surface of the cover member is made rough by etching the surface with acid.

16. The rechargeable battery of claim 14, wherein the surface of the cover member is made rough by scratching the surface.

17. A rechargeable battery with an integrated protection circuit, comprising:
- a case having an enclosed internal space for housing a battery cell;
- a circuit board having a protection circuit, the circuit board electrically connected to the case at a first end;
- a reinforcing member formed at the first end where the circuit board is connected; and
- a molding member formed at the first end for encapsulating the circuit board and the reinforcing member,
- wherein the reinforcing member is formed such that an outer perimeter of the reinforcing member is within a perimeter of an opening of the case by a predetermined distance.

18. A rechargeable battery with an integrated protection circuit, comprising:
- a case having an enclosed internal space for housing a battery cell;
- a circuit board having a protection circuit, the circuit board electrically connected to the case at a first end;
- a reinforcing member formed at the first end where the circuit board is connected; and
- a molding member formed at the first end for encapsulating the circuit board and the reinforcing member,
- wherein the reinforcing member comprises an elongated plate forming an edge along the periphery of the first end of the case.

19. The rechargeable battery of claim 18, wherein the reinforcing member is projected a predetermined distance away from the first end of the case.

20. The rechargeable battery of claim 18, wherein the reinforcing member is discontinuously formed along the periphery of the first end of the case.

21. The rechargeable battery of claim 20, wherein the reinforcing member comprises:
- a first reinforcing part formed at a first edge of the first end and extending to lateral edges thereof; and
- a second reinforcing part formed at a second edge of the first end of the case.

22. The rechargeable battery of claim 21, wherein the first and second reinforcing parts are formed at a predetermined inward distance from the outer circumference of the first end.

23. The rechargeable battery of claim 21, wherein the first and second reinforcing parts comprise a plurality of holes.

* * * * *